United States Patent [19]

Cameron

[11] Patent Number: 5,308,587
[45] Date of Patent: May 3, 1994

[54] COOLED SULPHUR FURNACE BYPASS SYSTEM

[76] Inventor: Gordon M. Cameron, 4 Wellesbourne Cres., Willowdale, Ontario, Canada, M2H 1Y7

[21] Appl. No.: 956,298

[22] Filed: Oct. 5, 1992

[30] Foreign Application Priority Data

Nov. 11, 1991 [CA] Canada .................. 2055848

[51] Int. Cl.$^5$ ............................. C01B 17/54
[52] U.S. Cl. .................. 422/160; 422/161; 423/533
[58] Field of Search .......... 422/160, 161; 423/533

[56] References Cited

U.S. PATENT DOCUMENTS

| | | | |
|---|---|---|---|
| 3,803,297 | 4/1979 | Guth et al. | 422/160 |
| 3,880,985 | 4/1975 | Haeseler et al. | 423/533 |
| 3,963,423 | 6/1976 | Dorr et al. | 422/160 |
| 4,016,248 | 4/1977 | Vydra et al. | 423/533 |
| 4,296,088 | 10/1981 | Staüffer | 423/533 |
| 4,533,537 | 8/1985 | Dittmar et al. | 423/533 |

Primary Examiner—Timothy M. McMahon
Attorney, Agent, or Firm—Smith, Lyons, Torrance, Stevenson & Mayer

[57] ABSTRACT

Apparatus and process for the production of gaseous sulphur dioxide mixture for conversion to sulphur trioxide in a catalytic converter in the production of sulphuric acid by the contact process. Apparatus comprises the furnace to produce sulphur dioxide gas from elemental sulphur and a first dry air stream; means for feeding a first portion of the sulphur dioxide gas to a waste heat boiler to cool the gas; the improvement comprising combining a second portion of the sulphur dioxide gas exiting the furnace with a second dry air stream to provide a combined gaseous stream which bypasses the boiler and subsequently is combined with the cooled sulphur dioxide stream. The system provides use of a bypass valve which experiences only cooled sulphur dioxide containing gases with its attendant reduced corrosion. Further, the system may operate at higher temperatures than is common to provide further advantages.

5 Claims, 2 Drawing Sheets

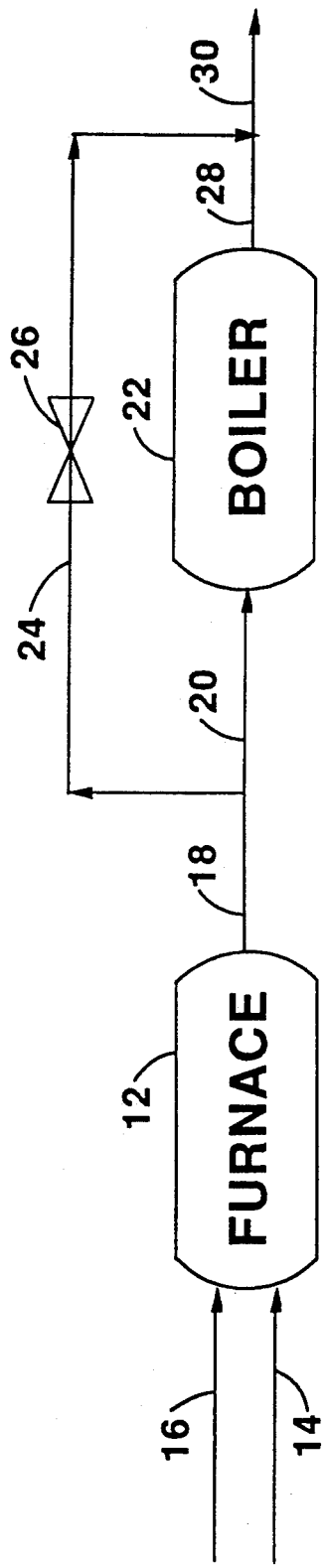
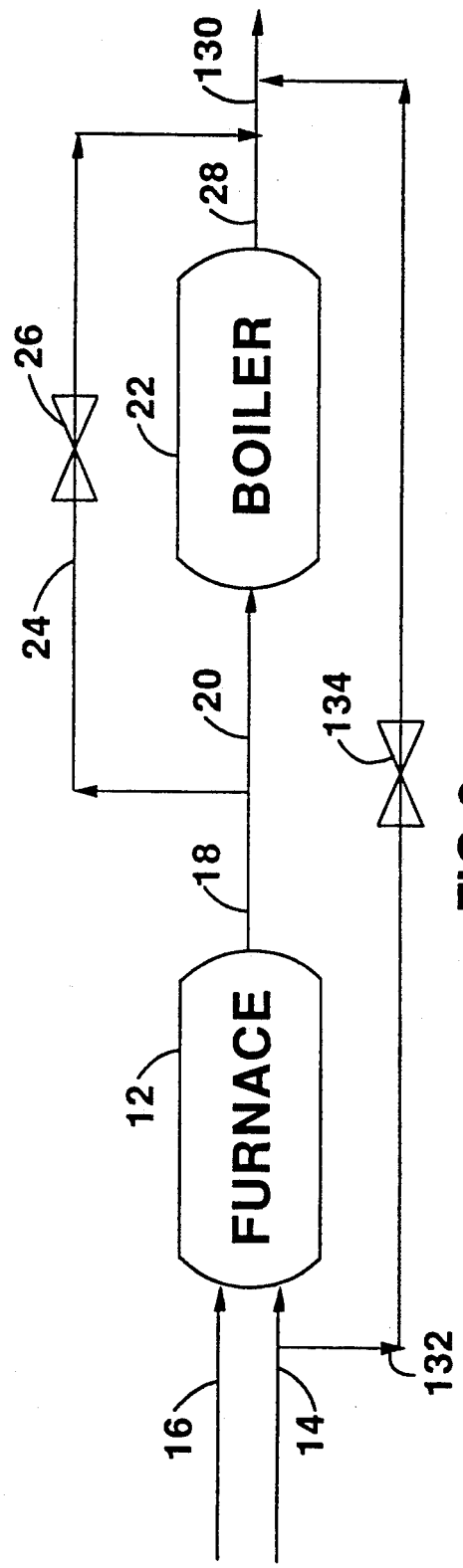
FIG 1. PRIOR ART
FIG 2. PRIOR ART

COOLED SULPHUR FURNACE BYPASS SYSTEM

FIELD OF THE INVENTION

This invention relates to the production of sulphur dioxide gas by the burning of elemental sulphur in a furnace and the cooling thereof. More particularly, it relates to said system in the production of sulphuric acid.

BACKGROUND OF THE INVENTION

In sulphuric acid manufacture from sulphur by the contact process, elemental sulphur is burned in a large excess of dry air in a sulphur furnace to produce a gaseous sulphur dioxide-air mixture at a temperature in the range of 900°–1100° C., containing 8–12% v/v $SO_2$ and significant, excess oxygen. The downstream conversion of the resultant sulphur dioxide to sulphur trioxide requires 1 mole of oxygen for every 2 moles of sulphur dioxide and since there is a need for excess oxygen to drive the chemical equilibrium to low concentrations of sulphur dioxide there is always much more oxygen than required for stoichiometric combustion of sulphur to sulphur dioxide. The stoichiometric sulphur oxidation would produce a 21% sulphur dioxide gaseous mixture.

Downstream of the furnace in almost all sulphur burning plants is a waste-heat boiler, which cools the sulphur containing gas to, typically, 390°–420° C. for supply to a catalytic converter, while raising steam at pressures in the range 40–60 atm. These steam pressures correspond to boiling water temperatures in the range of 250° to 275° C.

The temperature of the sulphur dioxide containing gas fed to the converter is regulated at present by allowing a portion of the hot sulphur dioxide gas leaving the furnace to bypass the boiler through a hot gas bypass valve. The hot sulphur dioxide containing gas produced in the furnace is, however, very corrosive and few, if any, metallic materials provide a long and reliable life for the valve in the hot sulphur dioxide containing environment. In consequence, furnace temperatures are generally restricted and damper valves at normal design temperatures of about 950° to 1050° C. already have a limited life and require repairs at major plant shutdowns. Typical materials used for the valves include 310, 442 and 446 stainless steel, and several nickel based alloys. Ducting is typically brick lined and a typical valve uses a damper closing on a brick seat having a vertical movement of the valve. Unfortunately, such a valve seat does not provide a tight seal, which results in hot gas bypassing even when the valve is closed. In consequence, the boiler must therefor cool the gas below the desired temperature for entering the first bed of a converter in order to compensate for this hot gas leakage. This results in wasteful additional cooling surface in the boiler to achieve the required cooling.

A further variation on furnace and boiler design systems has air bypassing both the furnace and the boiler, with hot gas also bypassing the boiler. With both air and hot gas bypassing the boiler the temperature of the exit gas leaving the boiler is now higher than in the previous prior art arrangement, for the same converter gas inlet temperature and results in more efficient heat transfer. However, the furnace gas temperature is higher and the corrosive attack on the bypass valve is accelerated as compared to the earlier described system.

Both of the above bypass arrangements represent prior art systems which leave the hot gas bypass valve exposed to very high temperatures where the valve life is limited, despite the use of expensive heat and corrosion resistant alloys.

With plant sizes, steam pressures and boiling temperatures increasing, and lower temperature catalysts available on the market, cooling of the gases between the furnace and the converter by means of the boiler is becoming increasingly difficult as the typical fire-tube boiler used in sulphuric acid plants is becoming difficult to provide in many cases. In addition, the trend to higher efficiency in acid plants also tends to reduce the throughput air used, which further raises the furnace temperature and reduces the life of the bypass valve.

SUMMARY OF THE INVENTION

It is an object of the present invention to provide an improved sulphur burning furnace and boiler system which allows the bypass valve associated therewith to be suitably located in a cooled gas environment.

In a further object, the present invention provides an improved furnace and boiler system which allows a higher furnace operating temperature without raising the temperature of the bypass valve associated therewith to unsafe levels and compromising valve life.

In yet a further object, the present invention provides a furnace and boiler system as hereinabove described having a bypass system fabricable from available stainless steels and other materials and having a longer life than is presently conventionally obtainable.

These and other objects and advantages of this invention will become apparent upon reading the following specification taken in conjunction with the accompanying drawings.

Accordingly, in its broadest aspect the invention provides in an existing sulphuric acid facility in which sulphur and dry air are fed to a sulphur dioxide generating furnace and generated sulphur dioxide-containing gas is fed to a waste-heat boiler to produce a cooled sulphur dioxide product for a catalytic converter for the production of sulphur trioxide, said facility comprising: said furnace to produce said generated sulphur dioxide-containing gas; means for feeding sulphur to said furnace; means for feeding a first dry air stream to said furnace; said boiler; means for feeding a first portion of said generated sulphur dioxide-containing gas to said boiler to provide a cooled gaseous stream; the improvement comprising: means for combining a second portion of said generated sulphur dioxide-containing gas with a second dry air stream to provide a combined gaseous stream; and means for combining said combined gaseous stream and said cooled gaseous stream to produce said cooled sulphur dioxide product.

In a further aspect the invention provides a process in an existing sulphuric acid facility in which sulphur and dry air are fed to a sulphur dioxide generating furnace and generated sulphur dioxide-containing gas is fed to a waste-heat boiler to produce a cooled sulphur dioxide product for feeding to a catalytic converter for the production of sulphur trioxide, said process comprising feeding sulphur and a first dry air stream to said furnace to produce said generated sulphur dioxide-containing gas; feeding a first portion of said generated sulphur dioxide-containing gas to said boiler to provide a cooled gaseous stream; the improvement comprising: combining a second portion of said generated sulphur-dioxide-containing gas with a second dry air stream to provide a combined gaseous stream; and combining said combined gaseous stream with said cooled gas stream to provide said cooled sulphur dioxide product.

Thus, an important aspect of the present invention is to provide a hot sulphur dioxide bypass system wherein the sulphur dioxide of the bypass system is admixed with dry air such that the resultant dry air-sulphur dioxide mixture has a temperature selected, typically, from the range 350° to 600° C.; a range in which most stainless steels have a long life expectancy. This is to be contrasted with the very high 1050° to 1300° C. temperatures of the hot gas emanating from the furnace. The potential bypass air stream is as much as 40 to 50% of the total air stream required. In contrast, the hot gas bypass stream is much smaller as the gas temperature of the product mixture fed to the converter is closer to the temperature of the boiling water of the boiler than to the furnace gas temperature.

Thus, the invention provides the ability to bypass air around the furnace and/or the furnace and boiler in sufficient volumes to provide a significant temperature decrease from the furnace gas temperature to an acceptable temperature providing a longer life for common bypass valve materials. The invention further provides the ability to bypass hot gas or tempered gas around the boiler. By providing a significant proportion of the dry air feed around the furnace and boiler, small and less costly equipment can be used. Further, furnace temperatures can now be raised by significant air bypassing which provides for enhanced furnace flame stability, better sulfur combustion, and a smaller furnace. Metallic ducting can also be used downstream of the sulphur dioxide and dry air mixing location, which provides for easier installation and lower costs associated with such metallic ducting compared to the present brick-lined carbon steel ducting.

BRIEF DESCRIPTION OF THE DRAWINGS

In order that the invention may be better understood a preferred embodiment will now be described, by way of example only, with reference to the accompanying drawings, wherein;

FIG. 1 shows a schematic layout of a furnace and boiler system of the prior art;

FIG. 2 is a schematic layout of an alternative furnace and boiler system of the prior art.

The numerals common to the Figures denote the same parts and process steps.

Figure 3:
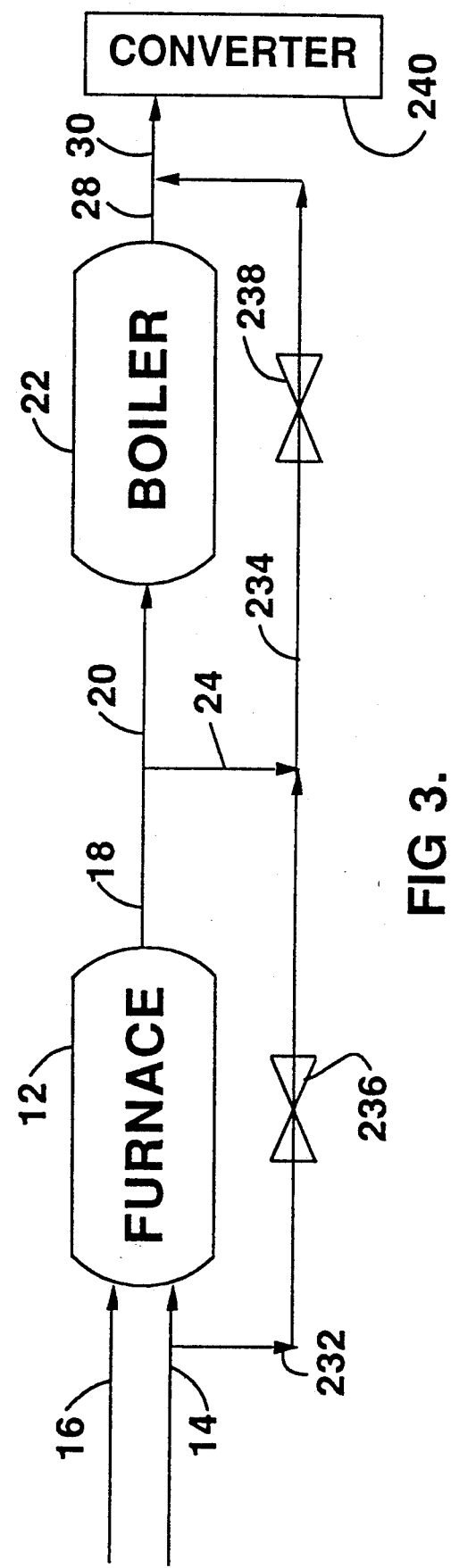
FIG. 3 is a schematic layout of a furnace and boiler system according to the present invention.

Each of the Figures shows a sulphur dioxide generating furnace 12 having two feed inlets, namely, an air inlet 14 and a molten sulphur inlet 16; and a generated sulphur dioxide-containing gas outlet conduit 18.

Exit conduit 18 is divided to provide a first portion of the generated sulphur dioxide-containing gas fed by conduit 20 to waste heat boiler 22, and a second portion of the generated sulphur dioxide-containing gas in bypass conduit 24, which has a bypass valve 26 (FIG. 1 and FIG. 2, only). Boiler 22 is provided with a conduit 28 through which the cooled sulphur dioxide gaseous stream exits boiler 22.

With reference to the prior art systems of FIG. 1, the second portion of the generated sulphur dioxide-containing gas is combined with the cooled gaseous stream of conduit 28 and transferred, via conduit 30, to a catalytic converter (not shown).

In the alternative prior art embodiment as shown in FIG. 2, the system has a bypass dry air conduit 132 and control air bypass valve 134 whereby a second dry air stream is combined with both the bypass second portion of the generated sulphur dioxide-containing gas of conduit 24 and the cooled gaseous stream of conduit 28, to produce a combined cooled gaseous stream, which is fed through conduit 130 to a catalytic converter (not shown).

In both of the above systems, bypass valve 26 experiences hot, circa 1000° C., sulphur dioxide-containing gas, with all the attendant problems.

With particular reference to FIG. 3, the second portion of the sulphur dioxide-containing gas of conduit 24 is combined with a second dry air stream of conduit 232, emanating from conduit 14 in the embodiment shown. The combined gaseous stream transferred through conduit 234 is combined with the cooled gaseous stream contained in conduit 28 to produce cooled sulphur dioxide product, which is transferred to catalytic converter 240. The second dry air stream in conduit 232 is controlled by bypass valve 236, while the combined gaseous stream contained in conduit 234 is controlled by bypass valve 238.

It can be readily seen in the embodiment according to the invention that no bypass valve experiences the very hot generated sulphur dioxide-containing gas until the latter has been significantly diluted with dry air and cooled thereby.

In operation, dry air at a pressure in the range 3 to 12 p.s.i.g. enters the system along conduit 14 and is split into a combustion air stream for the furnace and a bypass air stream for conduit 232. A molten sulphur stream enters furnace 12, which is operating at a temperature circa 1100° C., through conduit 16 and injected in atomised form under pressure, where it is mixed and burnt in the air entering through conduit 14. The combustion air stream will, typically, incorporate enough oxygen to convert the sulphur to sulphur dioxide and enough excess oxygen to ensure that no sulphur proceeds untreated to downstream waste-heat boiler 22.

The furnace exit gas enriched in sulphur dioxide from the burning of the sulphur in the air has a gas strength in the range 10 to 12% v/v sulphur dioxide. The generated sulphur dioxide-containing gas of conduit 20 entering boiler 32 is cooled therein to a temperature of 400° to 450° C., which is a typical temperature range suitable for the catalysis effected in converter 240.

The proportion of the second portion of the generated sulphur dioxide containing gas of conduit 24 is readily selectable by the operator skilled in the art and controlled by bypass valve 238, after admixture with the second dry air stream of conduit 232, controlled by bypass valve 236.

The invention allows furnace sulphur dioxide gas strengths and temperatures to approach the stoichiometric limit of 21% sulphur dioxide without concern about hot gas attack on the bypass valve, subject to normal combustion considerations and a use of appropriate materials in the high temperature gas exposed areas. In conventional obtained which compares with 11-12% sulphur dioxide concentration entering the converter. For such a case, one-third of the air would bypass the furnace and boiler, resulting in a rise in boiler exit temperature well in excess of 100° C. and a doubling of the rate of heat transfer in the cold gas end of the boiler.

Although this disclosure has described and illustrated certain preferred embodiments of the invention, it is to be understood that the invention is not restricted to those particular embodiments. Rather, the invention includes all embodiments which are functional or mechanical equivalents of the specific embodiment and features that have been described and illustrated.

The embodiments of the invention in which an exclusive property or privilege is claimed are defined as follows:

1. In an existing sulphuric acid facility in which sulphur and dry air are fed to a sulphur dioxide generating furnace to generate a sulphur dioxide containing gas and said generated sulphur dioxide is fed to a waste-heat boiler to produce a cooled sulphur dioxide product for a catalytic converter for the production of sulphur trioxide, said facility comprising:

a sulphur dioxide generating furnace to produce said generated sulphur dioxide-containing gas; said furnace having sulphur inlet means for feeding sulphur to said furnace and air inlet means for feeding a first dry air stream to said furnace; a waste heat boiler;

conduit means connecting said furnace to said boiler for feeding a first portion of said generated sulphur dioxide-containing gas from said furnace to said boiler to provide a cooled gaseous stream; the improvement comprising:

conduit means for combining a second portion of said generated sulphur dioxide-containing gas with a second dry air stream to provide a combined gaseous stream; and conduit means for combining said combined gaseous stream and said cooled gaseous stream to produce said cooled sulphur dioxide product.

2. A facility as claimed in claim 1 further comprising first bypass valve means to control the amount of said combined gaseous stream combined with said cooled gaseous stream.

3. A facility as claimed in claim 1 further comprising second bypass valve means to control the amount of said second dry air stream to be combined with said second portion of said generated sulphur dioxide-containing gas.

4. A facility as claimed in claim 3 wherein said first dry air stream and said second dry air stream emanate from the same dry air source.

5. A facility as claimed in claim 1 further comprising conduit means for feeding said cooled sulphur dioxide product to said catalytic converter.

* * * * *